March 8, 1938.  E. A. MINTON  2,110,810
PRINTER'S CLAMP
Filed Sept. 17, 1936
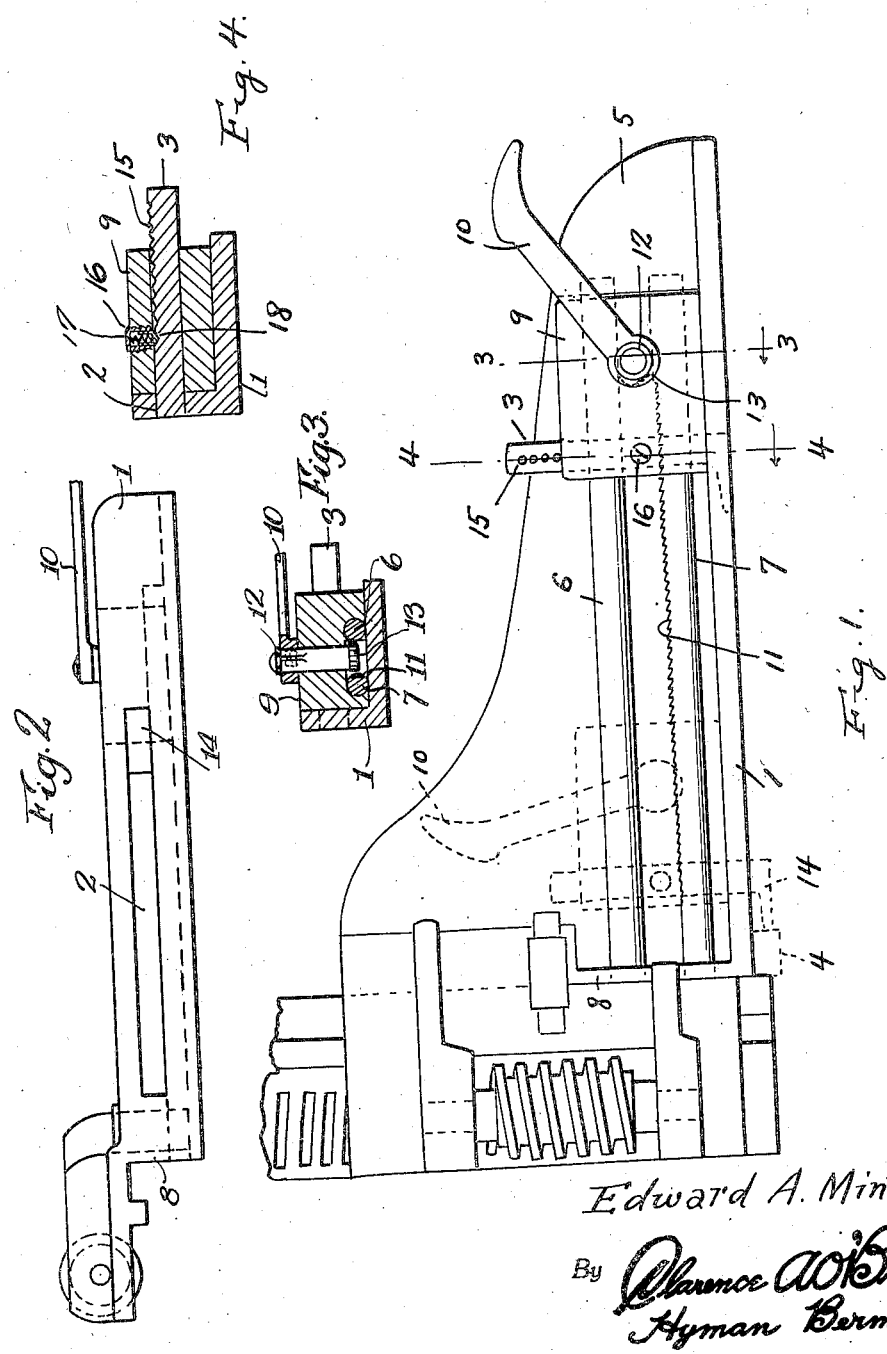
Inventor
Edward A. Minton
By Clarence A. O'Brien
Hyman Berman
Attorneys Patented Mar. 8, 1938

2,110,810

UNITED STATES PATENT OFFICE 2,110,810

PRINTER'S CLAMP

Edward A. Minton, Appleton, Wis.

Application September 17, 1936, Serial No. 101,317

1 Claim. (Cl. 29—67)

The object of my present invention is the provision of a simple and advantageous clamp for use on and in association with the side gauge of a printer's saw trimmer.

My novel clamp is designed more especially for holding small slugs and type to be sawed, and it is practically advantageous because of its simplicity, the facility with which it may be operated for the holding of small work down to one-half pica, and the fact that it is never in the way and does not interfere in any measure with the use of a regular clamp when the latter is in use.

To the attainment of the foregoing the invention consists in the improvement as hereinafter described and definitely claimed.

In the accompanying drawing, forming part of this specification:—

Figure 1 is a top plan view showing the clamp constituting the preferred embodiment of my invention as properly arranged relatively to the side gauge of a printer's saw trimmer.

Figure 2 is a view in side elevation of the same.

Figure 3 is a cross-section taken in the plane indicated by the line 3—3 of Figure 1.

Figure 4 is a cross section taken in the plane indicated by the line 4—4 of Figure 1.

Similar numerals of reference designate corresponding parts in all of the views of the drawing.

It will be understood that in all of the views alluded to my novel clamp is shown as properly arranged relatively to the side gauge of a well known type of trimmer saw, the said side gauge having a portion 1 of right angle form in cross section, in the upstanding plate of which is a slot 2 in which the dog 3 for holding the work is adapted to be moved, the piece of work to be cut being illustrated by dotted lines in Figure 1 and designated by 4.

In addition to the dog 3 my novel clamp comprises a heel portion or body 5, Figure 1, parallel rods 6 and 7 extending from the heel portion or body 5 and adapted to be fastened at their forward ends to the side gauge 8, a block 9 slidable on the rods 6 and 7 away from and toward the body or heel portion 5, and a finger trigger 10 adapted to cooperate with the rod 7, the rod 7 being provided with teeth 11, and the finger trigger 10 being pivotally mounted at 12 in the block 9 and being provided with the toothed portion 13 arranged on upward movement of the finger trigger to effectively hold the block 9 against retrograde movement. The dog 3 is provided with a foot 14 for directly contacting the piece of work 4, and is also provided with a shank having apertures at intervals in its length, the said apertures being designated by 15 and being adapted to receive means in the body 9 whereby the foot 14 of the dog may be arranged in the slot 2 of the upright plate of the gauge portion 1 or may be projected from said plate. By particular reference to Figure 4 it will be understood that the apertures 15 are in the form of indentures, and that the screw 16, Figures 1 and 4, does not directly engage the indentures of the dog shank. On the other hand, the screw 16 merely backs a spring 17 which operates to yieldingly press a detent 18 into engagement with the indented portion of the dog shank. From this it follows that by exerting slight pressure against the inner end of the shank of the dog 3 or a slight pull thereon the foot of the dog may be positioned as desired relatively to the block 9, and that when the dog is properly placed there is little liability of it moving casually.

In the practical use of my novel clamp, the dog 3 is first set in the position desired and then the block 9 is slidably moved toward the back of the gauge until the dog foot 14 comes in contact with the piece of material 4, when the trigger finger 10 is swung forwardly to the dotted line position in Figure 1 when through the cooperation of said finger trigger 10 with the ratchet or teeth of the rod 7 the piece of material 4 will be strongly held in position. In order to bring about the release of the piece of material 4, the finger trigger is released when the block 9 will be free to slide away from and release the material 4. The position of the foot 14 is immaterial after operation is completed.

It will be appreciated from the foregoing that my novel clamp is especially adapted for use in newspaper plants where versatility and speed are essential, and that it is particularly useful in the cutting of small slugs and also for Monotype material when shoulders must be removed therefrom, cutting down to fit lines and cutting shell height.

While I have specifically described the preferred embodiment of my invention I do not desire to be understood as confining myself to the specific construction shown, such modification being available in practice as fairly fall within the scope of my invention as claimed.

Having described my invention, what I claim and desire to secure by Letters Patent, is:—

The clamp described comprising essentially a body, spaced side by side portions carried by and extending longitudinally from said body and adapted to be fastened at their forward ends to the side gauge of a trimmer saw, one of said portions being equipped with a ratchet, a block slidable on said portions toward and from the forward ends thereof, a finger trigger pivotally connected with the block and having a toothed portion to engage said ratchet, a work engaging dog extending forwardly relatively to the block, said dog having an angularly disposed shank sleeved in the block, and operating means complementary to the block and said shank for holding the dog against casual movement with respect to the block.

EDWARD A. MINTON.